United States Patent [19]

Therrien

[11] Patent Number: 4,509,077

[45] Date of Patent: Apr. 2, 1985

[54] AUTOMATIC, SELF-DIAGNOSING, ELECTRO-OPTICAL IMAGING SYSTEM

[75] Inventor: Roger H. Therrien, Waterloo, Canada

[73] Assignee: NCR Canada Ltd-NCR Canada LTEE, Mississauga, Canada

[21] Appl. No.: 450,582

[22] Filed: Dec. 17, 1982

[51] Int. Cl.³ .............................................. H04N 5/30
[52] U.S. Cl. .................................... 358/139; 358/213
[58] Field of Search .............. 358/212, 213, 209, 139, 358/106; 315/15.1

[56] References Cited

U.S. PATENT DOCUMENTS

| 3,379,826 | 4/1968 | Gray | 178/6 |
|---|---|---|---|
| 3,676,587 | 7/1972 | Kline | 358/139 |
| 3,697,674 | 10/1972 | Brewington | 358/139 |
| 3,717,077 | 2/1973 | Harvey | 95/10 CE |
| 3,741,088 | 6/1973 | Nobusawa | 95/10 CT |
| 3,944,816 | 3/1976 | Harada | 250/211 J |
| 3,952,144 | 4/1976 | Kolker | 178/6 |
| 4,050,085 | 9/1977 | Prince et al. | 358/219 |
| 4,133,008 | 1/1979 | Tisue | 358/282 |
| 4,174,528 | 11/1979 | White | 358/280 |
| 4,176,955 | 12/1979 | Yamada et al. | 356/222 |
| 4,202,014 | 5/1980 | Gilligan et al. | 358/228 |
| 4,249,197 | 2/1981 | van Spaandonk et al. | 358/10 |
| 4,287,536 | 9/1981 | Wiggins | 358/282 |
| 4,300,167 | 11/1981 | Miller et al. | 358/210 |
| 4,382,267 | 5/1983 | Angle | 358/213 |
| 4,415,927 | 11/1983 | Penney | 358/139 |
| 4,423,436 | 12/1983 | Kimura | 358/98 |
| 4,454,541 | 7/1984 | Duschl | 358/106 |

FOREIGN PATENT DOCUMENTS 67213 6/1977 Japan ................................ 358/139

Primary Examiner—Gene Z. Rubinson
Assistant Examiner—Robert G. Lev
Attorney, Agent, or Firm—Albert L. Sessler, Jr.; George Jameson

[57] ABSTRACT

An electro-optical imaging system is disclosed which automatically self-diagnoses the operations of its photosensor and its video processing circuitry during each of first and second modes of operation of a processor, when no object is being imaged. In a preferred embodiment, a power supply is controlled by the processor to prevent a light source from illuminating a reference background during the first mode of operation and to enable the light source to illuminate the reference background during the second mode of operation. The photosensor sequentially develops first and second signals respectively proportional to the intensity of reflected light received from the reference background during the first and second modes of operation. The video processing circuitry is responsive to the first and second signals for sequentially developing respective first and second data signals. A first circuit is responsive to the first and second signals for sequentially developing first and second test signals respectively proportional to the average values of respective portions of the first and second signals. A second circuit is responsive to the first and second data signals for sequentially developing third and fourth test signals respectively representative of predetermined portions of the first and second data signals. The processor is selectively responsive to the first, second, third and fourth test signals for automatically testing the operation of each of the photosensor and video processing circuitry during each of the first and second modes of operation.

29 Claims, 16 Drawing Figures

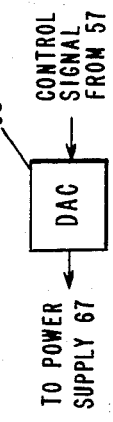
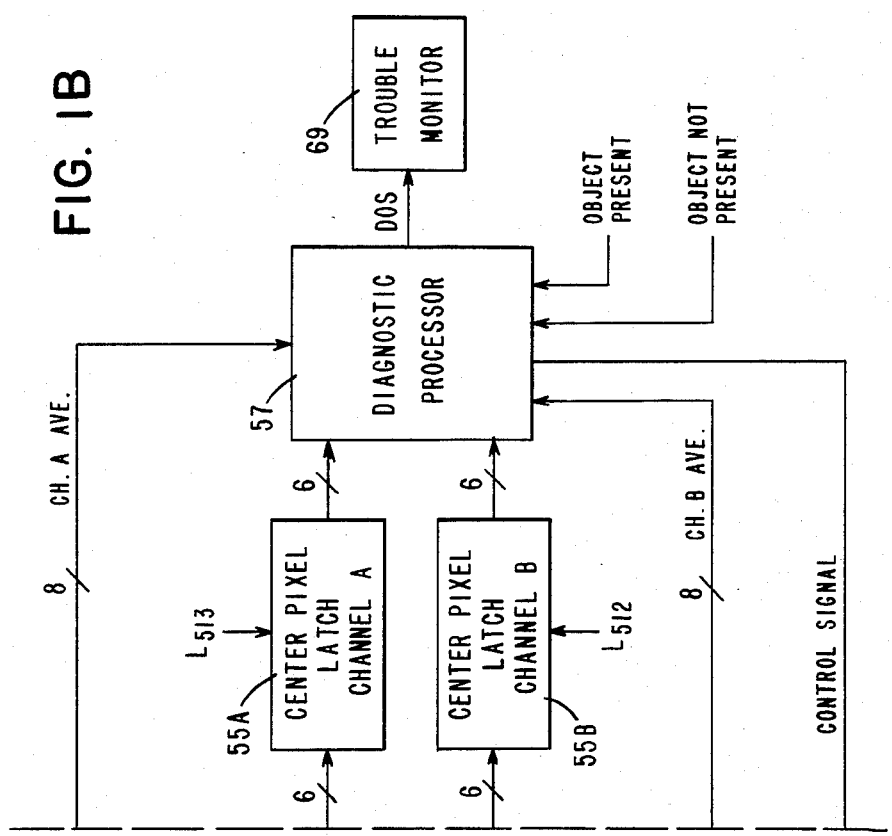

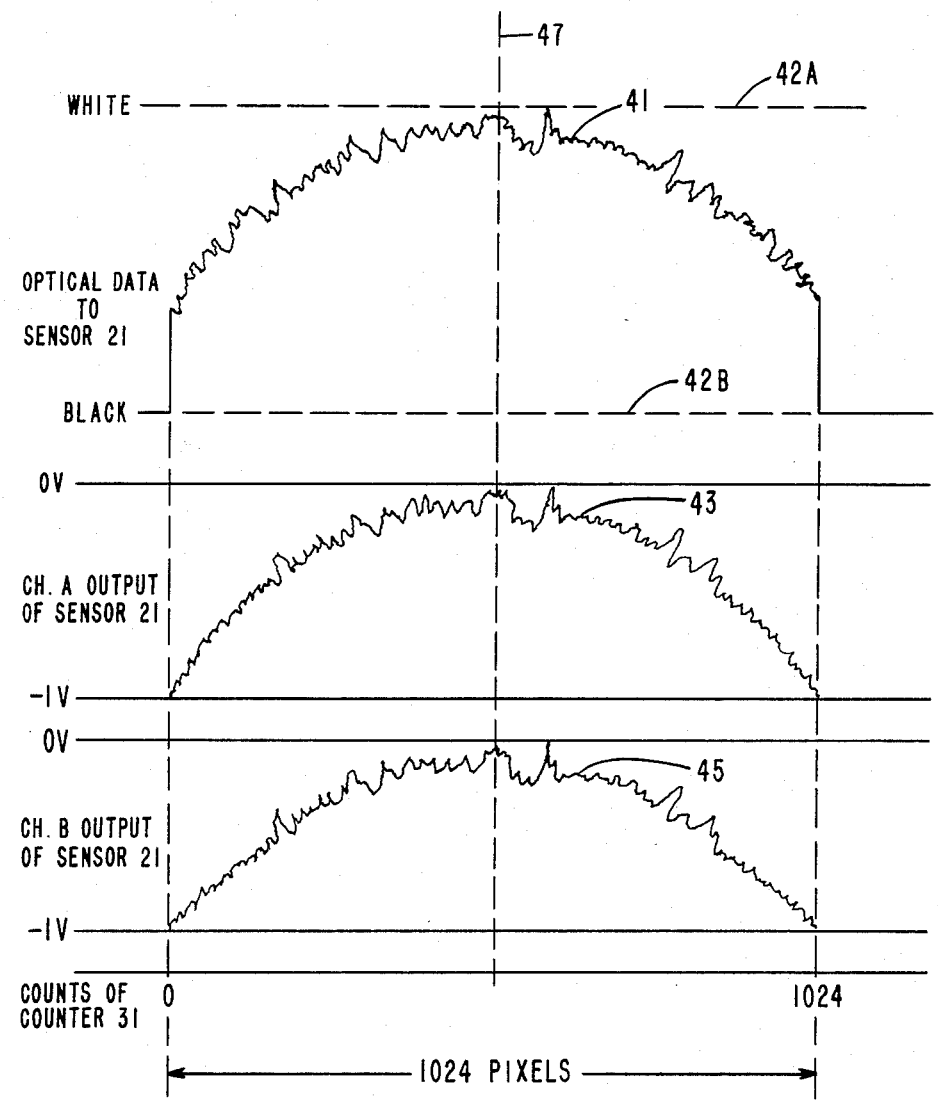

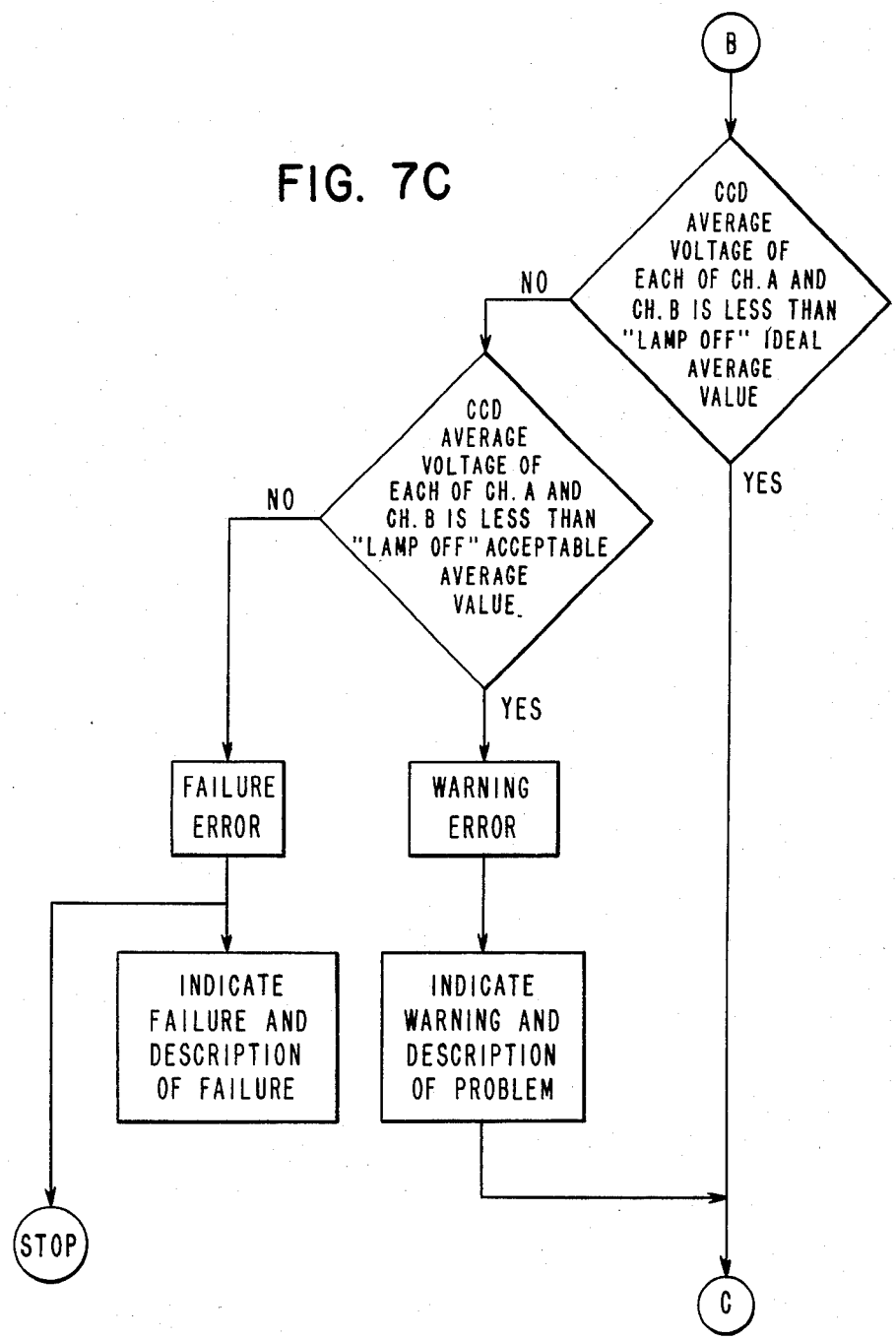

AUTOMATIC, SELF-DIAGNOSING, ELECTRO-OPTICAL IMAGING SYSTEM

CROSS-REFERENCE TO RELATED PATENT APPLICATION

This patent application contains subject matter related to our commonly assigned copending patent application, Ser. No. 435,014, filed Oct. 15, 1982, for "Automatic Light Control System".

BACKGROUND OF THE INVENTION

1. Field of the Invention

This invention relates to an electro-optical imaging apparatus and more particularly to an electro-optical imaging system which automatically performs self-diagnostic tests on itself.

2. Description of the Prior Art

With the tremendous, ever-expanding developments and advancements currently being made in the state of the electronics art, the complexity of the resultant advanced electronic equipment has increased at an extremely rapid rate. Associated with the increased complexity of these advanced electronic equipments, various problems have developed in relation to the field service of such complex electronic equipment. Maintenance costs on these equipments have sharply increased; and the number of adequately trained technicians to service these complex electronic equipment has not kept pace with the proliferation of such equipments. As a result, equipment down-time has increased for the customer of such equipments. In addition, technicians frequently incorrectly analyze the failures of such equipments, resulting in good electronic circuit boards being sent to associated repair depots as "suspect" boards for subsequent testing and repair. Finally, intermittent faults (faults which sometimes appear and then somehow seem to disappear) are frequently undetected by the technician.

Equipment down-time, as well as the original cost of the equipment and the subsequent maintenance costs, adds to the customer's cost of doing business, since the customer must continue to pay the operator of such equipment even when that equipment is not operational. Thus, it is important to the customer to have his equipment diagnosed and repaired as rapidly as possible to help minimize his cost of doing business.

In the specific electronic art of electro-optical imaging, many different types of apparatuses and systems have been proposed for controlling the operation of such imaging equipment. For example, typical exemplary prior art optical imaging apparatuses and systems have been proposed for: providing a visible warning on a monitor whenever portions of a received television image exceed a desired level of illumination (see U.S. Pat. No. 3,676,587); controlling the exposure time or integration time (see U.S. Pat. Nos. 3,717,077; 3,741,088; 3,944,816; 4,174,528; 4,176,955; and 4,202,014); adjusting the iris (see U.S. Pat. Nos. 4,050,085 and 4,300,167); controlling the background and contrast (see U.S. Pat. No. 3,952,144); adjusting a television camera (see U.S. Pat. No. 4,249,197); controlling the gain (see U.S. Pat. No. 4,287,536); and correcting for light intensity changes (see U.S. Pat. Nos. 3,379,826 and 4,133,008).

All of the above-described apparatuses and systems are basically directed to controlling various operational aspects of electro-optical imagers. None of these apparatuses and systems teach or even suggest any means for providing self-diagnostics of the equipment to give an operator an indication of either a failure or deteriorating condition of the equipment itself. In fact, applicants do not know of any prior art electro-optical imaging equipment which provides any such self-diagnostic operation.

SUMMARY OF THE INVENTION

Briefly, an electro-optical imaging system is provided which automatically performs self-diagnostic tests on itself.

In a preferred embodiment of this invention, a power supply is controlled by a diagnostic processor to prevent a light source from illuminating a reference background during a first mode of operation of the processor and to enable the light source to illuminate the reference background during a second mode of operation of the processor. A photosensor means sequentially develops first and second analog signals respectively proportional to the intensity of reflected light received from the reference background during the first and second modes of operation. A video processing means is responsive to the first and second analog signals for sequentially developing respective first and second data signals. First means is responsive to the first and second analog signals for sequentially developing first and second test signals respectively proportional to the average values of respective portions of the first and second analog signals. Second means is responsive to the first and second data signals for sequentially developing third and fourth test signals respectively representative of predetermined portions of the first and second data signals. The diagnostic processor is selectively responsive to the first, second, third and fourth test signals for automatically testing the operation of each of the photosensor means and video processing means during each of the first and second modes of operation.

It is, therefore, an object of this invention to provide a novel electro-optical imaging system and method therefor for automatically performing self-diagnostic tests on itself.

Another object of this invention is to provide a novel single channel, electro-optical imaging system and method therefor for automatically performing a self-diagnosis on itself.

Another object of this invention is to provide a novel multiple channel, electro-optical imaging system and method therefor for automatically performing a self-diagnosis on itself.

A further object of this invention is to provide a novel electro-optical imaging system and method for automatically self-diagnosing the operations of its photosensor means and its video processing means during each of first and second modes of operation.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein:

FIG. 4 illustrates waveforms useful in explaining the operation of the imaging sensor of FIG. 1;

FIG. 4A illustrates a modification that can be made to the preferred embodiment of FIG. 1;

FIGS. 7A through 7H illustrate flowcharts useful in explaining the operation of the diagnostic processor of FIGS. 1 and 6.

DESCRIPTION OF THE PREFERRED EMBODIMENT

Figure 1A:
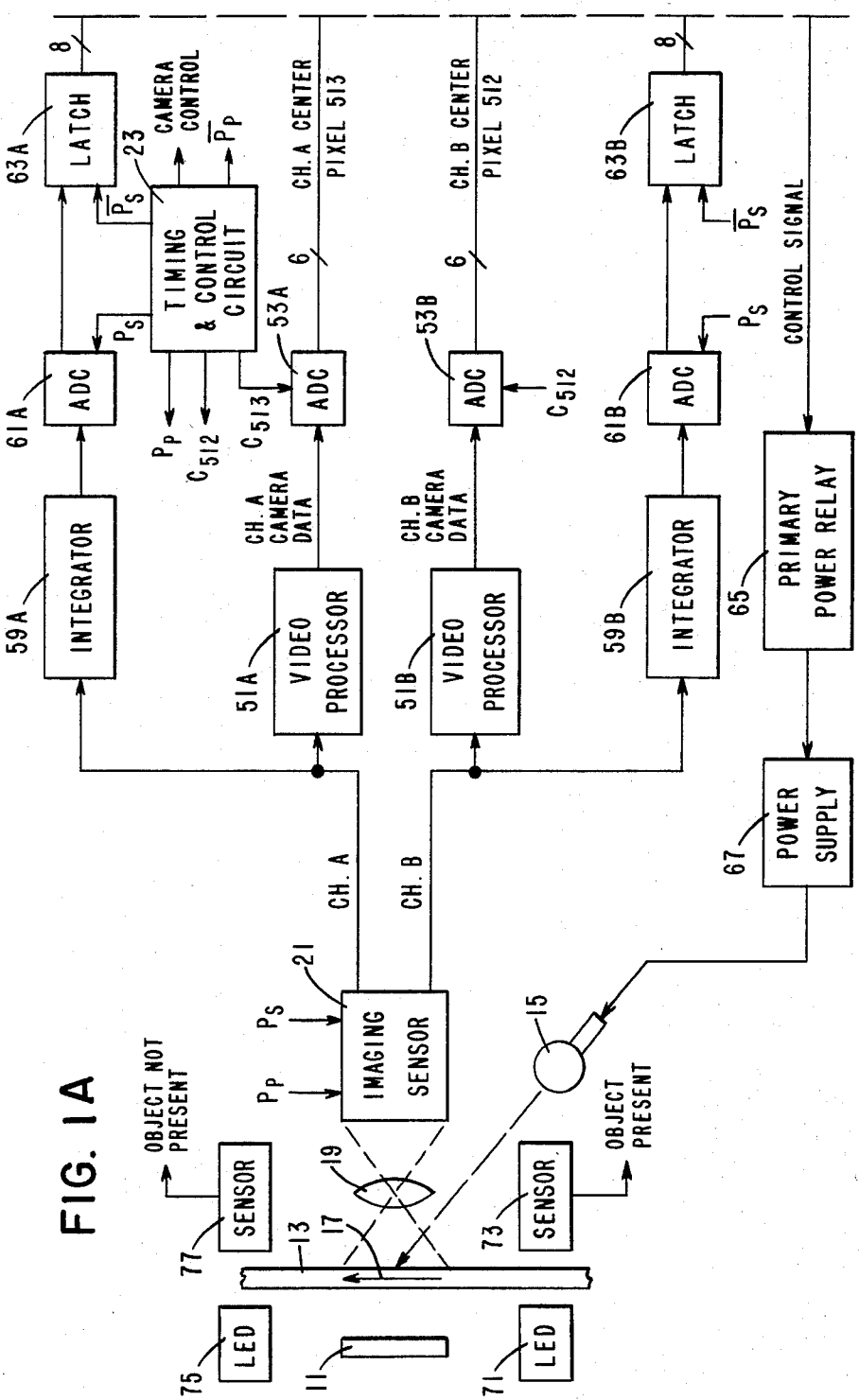
FIG. 1, which is comprised of FIGS. 1A and 1B, is a schematic block diagram of a preferred embodiment of the invention.

Referring now to the drawings, FIG. 1, which as stated before is comprised of FIGS. 1A and 1B, discloses a schematic block diagram of a preferred embodiment of the invention. More specifically, the invention is shown in a video camera environment or application for scanning information from moving objects. Means are shown, as explained below, for automatically self-diagnosing selected parts of the system shown in FIG. 1 during each of first and second modes of operation of the system when the system is initially turned on. In addition, subsequent tests can be automatically performed in between the scanning of consecutive objects during the second mode of operation, when no object is being scanned.

In the normal imaging of an object, the following operation occurs. A reference or reference background 11, which is preferably white in color, is mounted near or adjacent to a moving track or moving conveyor line or mounted on a rotating drum 13. When no object is present, the reference background 11 is illuminated by radiant energy, such as by light from a suitable light source or lamp 15. This reference background 11 is used by the system of the invention for contrast purposes to establish and help maintain the maximum or 100% light intensity level that is available from the light source 15 for imaging objects.

An object or document 17 to be imaged can be either stationary or transported by the moving track, moving conveyer line or rotating drum 13 along a path between the reference background 11 and a lens assembly 19. As the object 17 is moved across the reference background 11, it is illuminated by the light source 15. A reflected optical image of the object 17 is focused by the lens assembly 19 onto the face of an imaging sensor 21.

The imaging sensor 21 can be any photosensitive device that is capable of converting the reflected light, or optical image, incident thereon into a video signal or analog electrical voltage or current signal, which is proportional to the brightness of the reflected light received. For example, the imaging sensor 21 could comprise an array of photodiodes, a photosensor, a vidicon tube, a photoarray, a storage tube, a storage oscilloscope type tube, or a charge coupled device (CCD) or array.

Whenever a stationary object is to be imaged, the imaging sensor 21 must be an area sensor comprised of a matrix of, for example, photosensors addressed in two-dimensional coordinates by decoders or shift registers so as to select each individual element in turn and read out its charge.

Whenever a moving object is to be imaged, the imaging sensor 21 can be any photosensitive device that senses a single line. Such a linear sensor can be comprised of a single row of sensors and it may be used in a two-dimensional sense by using a mechanical scanner such as a rotating mirror or by moving the object to be scanned in front of and across the imaging sensor 21. In fact, it can even be a single sensor that is mechanically or electronically moved very quickly to perform a line scanning operation.

For purposes of this description, the present invention will be subsequently described as utilizing a CCD for the imaging sensor 21. However, as discussed above, it should be realized that the invention is not to be limited to only using a CCD as the imaging sensor 21.

Since, as shown in FIG. 1, an object 17, such as a document, is moved past the sensor 21 by the track 13, the CCD sensor will henceforth be described as a line scanning device. An exemplary line scanning CCD sensor 21 is a 1024-element linear image CCD sold by CCD Imaging Products Division, Fairchild Camera & Instrument Corporation, Palo Alto, Calif., as Model CCD 133/143. It has internal clock drivers which use two clock signals to shift information out of the photosensor chip. The Fairchild Model 133/143 also has internal black and white references and operates on a single power supply. The CCD sensor 21 has two output lines or channels (Ch. A and Ch. B), with each of the output channels A and B having an output from a different photosensitive element or cell on the CCD at a different time than that from a corresponding element or cell on the other output channel. Channel A, for example, represents the output of all of the odd-numbered photosensitive elements, while channel B represents the output of all of the evennumbered photosensitive elements on the CCD. Since each of these channel outputs contains video signals representing approximately one-half of the graphical image of the object, the video signals from channels A and B need to be subsequently combined by means of a demultiplexer (not shown) to obtain the complete image. CCD interlacing techniques, which form no part of this invention, are described in detail in U.S. Pat. No. 3,911,467.

Clocks $P_p$ and $P_s$ from a timing and control circuit 23, enable the CCD sensor 21 to selectively develop two sequences of alternate picture element (pixel) values from the photosensitive elements contained in the A and B channels of CCD sensor 21. It is the composite values, of each pixel sequence which forms the video signals, that represent one-half of the image of the object 17 being imaged. The structure and operation of the timing and control circuit 23 will now be discussed by referring to FIGS. 2 and 3.

Figure 2:
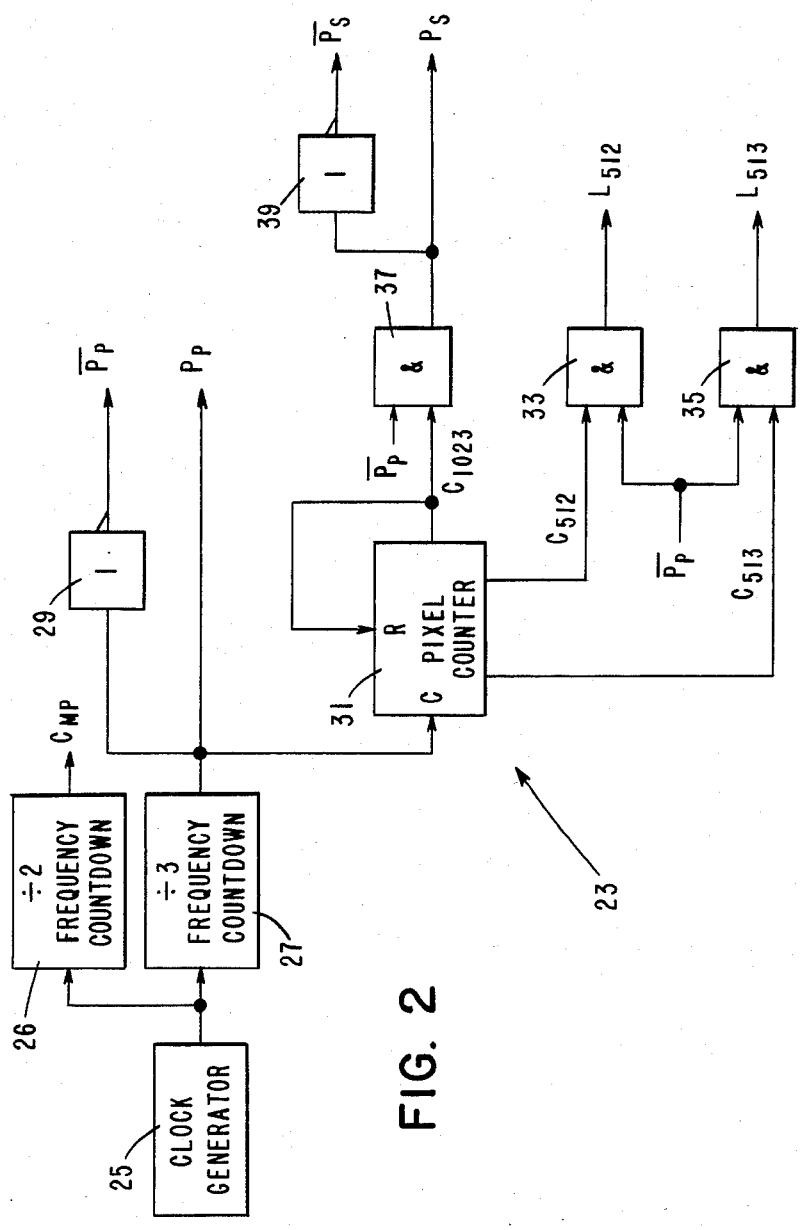
FIG. 2 is a schematic block diagram of the timing and control circuit of FIG. 1.
Figure 3:
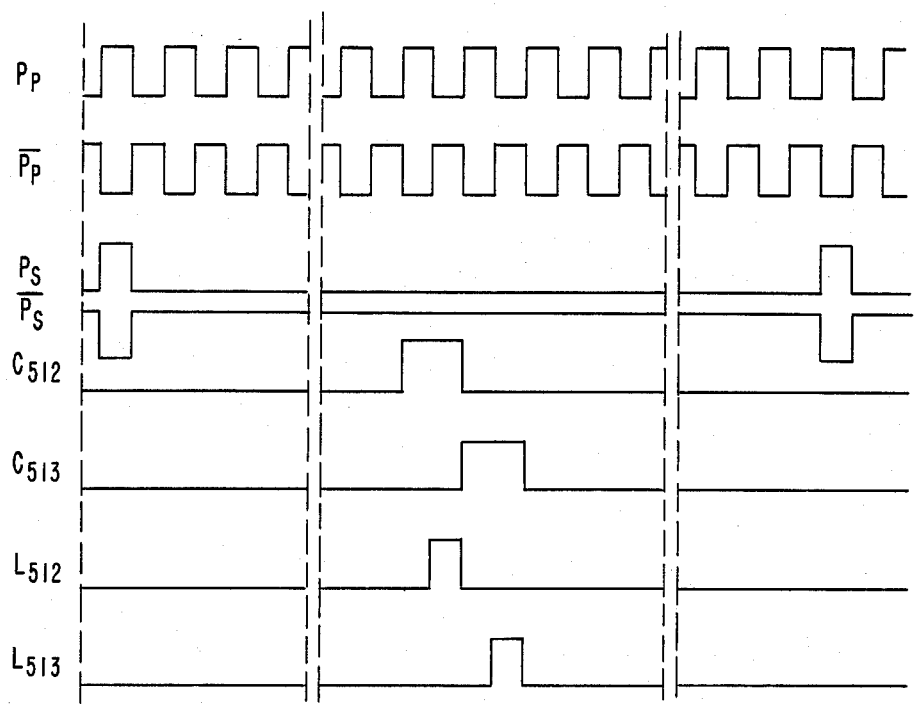
FIG. 3 illustrates waveforms useful in explaining the operation of the timing and control circuit of FIG. 2.

In FIG. 2, a clock generator 25 generates basic clocks which have a frequency of approximately eleven megahertz (11 MHz). The basic clocks from clock generator 25 are counted down by a divide-by-two ($\div 2$) frequency countdown circuit 26 to develop $C_{MP}$ clocks (to be explained). These basic clocks from the clock generator 25 are also counted down by a divide-by-three ($\div 3$) frequency countdown circuit 27 to develop transport or pixel clock pulses $P_p$ which, in turn are logically inverted by an inverter 29 to develop $\overline{P}_p$ clocks. Each of the $P_p$ and $\overline{P}_p$ clocks has an interpulse period of approximately 270 nanoseconds. Transport clocks $P_p$ control the readout rate of video data from the 1024 cells in the CCD sensor 21 at a rate of approximately 270 nanoseconds per pixel.

The leading edge of each transport clock $P_p$ increments a synchronous binary pixel counter 31 by one. The counts of 512, 513 and 1023 of the counter 31 are sequentially internally decoded by the counter 31. When the counter 31 reaches a count of 512, it develops a 1 state count pulse $C_{512}$ to enable an AND gate 33 to pass the positive alternation of the following $\overline{P}_p$ pulse, identified in FIGS. 2 and 3 as latch pulse $L_{512}$. When the counter 31 reaches a count of 513, it develops a 1 state count pulse $C_{513}$ to enable an AND gate 35 to pass the positive alternation of the following $\overline{P}_p$ pulse, identified in FIGS. 2 and 3 as latch pulse $L_{513}$.

At the time that the counter 31 reaches a count of 1023 (a binary count of 1111111111), it applies a 1 state count pulse $C_{1023}$ to enable an AND gate 37 to pass the next positive alternation of the $\overline{P}_p$ clock as a transfer or end-of-scan clock pulse $P_s$. Transfer clock $P_s$ is also logically inverted by an inverter 39 to develop a $\overline{P}_s$ signal. The count pulse $C_{1023}$ is also applied to the reset (R) input of counter 31. This 1 state count pulse $C_{1023}$ enables the counter 31 to synchronously reset its output count to zero on the rising edge of the next transport clock $P_p$. Thus, during each line scan of the sensor 21, the counter 31 develops a total of 1024 different counts. The scan interval or interpulse period of the transfer clock $P_s$ is approximately 285 microseconds.

Transfer clock $P_s$ occurs at the end of each line scan and controls the integration time of the sensor 21. This so-called integration time of the CCD sensor 21 is analogous to the exposure time in conventional cameras.

Referring now to FIG. 4, various waveforms are illustrated to more clearly explain the operation of the CCD sensor 21 under the control of the timing and control circuit 23. Waveform 41 illustrates the reflected optical data that is focused by the lens assembly 19 onto the face of the CCD sensor 21. Dashed lines 42A and 42B respectively represent the two extremes of optical signals (whitest white and blackest black) of the 64 levels of gray that can be received by the CCD sensor 21. It should be recalled that channels A and B of the sensor 21 respectively develop the odd- and even-numbered pixels during each line scan. Thus, channels A and B of the sensor 21 will respectively develop the odd-numbered and even-numbered sequences of pixels that occur between the counts 0 through 1023 of the counter 31 during the 1024 counter counts in each linear scan of the sensor 21. The outputs of channels A and B are respectively shown in the waveforms 43 and 45. These outputs in waveforms 43 and 45 are shown varying in amplitude in the range, for example, from zero volts (0 V) to minus one volt (−1 V).

The optical axis of the data illustrated in waveforms 41, 43 and 45 is shown by the dashed line 47. The pixels 512 and 513 (not shown in FIG. 4) occur adjacent to and on opposite sides of this optical axis 47 and are respectively developed by channels B and A during the counts 512 and 513 of counter 31.

Referring back to FIG. 1, sequences of video output signals are respectively developed by output channels A and B of the sensor 21 as the sensor 21 performs its line scanning operation. The channel B video signal from sensor 21 is processed by a video processor 51B to develop camera data for channel B. Video processor 51B may contain any desired video processing circuitry such as, for example, a video amplifier circuit or gain, offset and digitizing circuitry (not shown). The specific type of processing circuitry used in the video processor 51B depends only upon the operational requirements of the user of the equipment and forms no part of this invention.

Pulse $C_{512}$ from the timing and control circuit 23 (also see FIG. 2) enables an analog-to-digital converter (ADC) 53B to digitize the 512th pixel in the channel B camera data from processor 51B. The digitized pixel 512 is applied from ADC 53B to the input of a channel B center pixel latch 55B. As indicated before, the pixel 512 is the center pixel in the B channel. Digitized center pixel 512 is six bits wide to preserve the amplitude information in pixel 512, since each photosensitive element or cell in the sensor 21 is capable of optically sensing any one of 64 different levels of gray. Latch pulse $L_{512}$, which occurs after the output of ADC 53B (digitized pixel 512) has stabilized, enables the latch 55B to store the digitized center pixel 512 and apply that pixel to a diagnostic processor 57.

The channel B video signal from the CCD sensor 21 is also continuously integrated by an integrator 59B to develop an analog information signal that is proportional to the average amount of reflected light received by channel B of the sensor 21 during each line scan. Transfer clock $P_s$ enables an analog-to-digital converter (ADC) 61B to convert this analog information signal to a parallel-formatted, eight-bit wide signal. The rising edge of the $\overline{P}_s$ signal enables a latch 63B to store the digitized information signal from the ADC 61B and apply that signal to the diagnostic processor 57.

Each of the latches 55B and 63B may comprise a plurality of D-type flip flops for respectively receiving in parallel the bits contained in the associated parallel-formatted digital signal applied thereto.

The circuits 51A, 53A, 55A, 59A, 61A and 63A, which selectively utilize the channel A video output of imaging sensor 21, are respectively similar in both structure and operation to the circuits 51B, 53B, 55B, 59B, 61B and 63B which selectively utilize the channel B video output of imaging sensor 21. Specific operational differences are discussed below.

The channel A video signal from sensor 21 is processed by a video processor 51A to develop camera data for channel A. Pulse $C_{513}$ from the timing and control circuit 23 enables ADC 53A to digitize the 513th pixel in the channel A camera data from the processor 51A. The pixel 513 is the center pixel in the A channel. This digitized center pixel 513 is six bits wide. Latch pulse $L_{513}$ enables a channel A center pixel latch 55A to store the digitized center pixel 513 from ADC 53A and apply that pixel to the diagnostic processor 57.

The channel A video signal from sensor 21 is also continuously integrated by an integrator 59A to develop an analog information signal that is proportional to the average amount of reflected light received by channel A of the sensor 21 during each line scan. Transfer clock $P_s$ enables an ADC 61A to convert this analog information signal to a parallel-formatted, eight-bit wide signal. The rising edge of the $\overline{P}_s$ signal enables a latch 63A to store the digitized information signal from the ADC 61A and apply that signal to the diagnostic processor 57.

It should be noted at this time that camera data from video processors 51A and 51B, as well as camera control signals from timing and control circuit 23, which signals may include the signals $P_p$, $\overline{P}_p$, $P_s$ and $\overline{P}_s$, can be further utilized by other video processing circuits (not shown). Such further utilization of this data and these signals is beyond the purview of this invention and, hence, will not be further discussed.

Because of the different reflectivities of different objects being sequentially imaged, no self-diagnostic tests can be accurately and repeatably performed by the system of FIG. 1 when an object 17 is being imaged. Consequently, as it was previously stated, the system of FIG. 1 automatically self-diagnoses "selected parts" of itself during a first mode of operation of the system after power is initially applied to the system and subsequently during a second mode of operation of the system when no object 17 is being scanned by the imaging sensor 21 (or in between the scanning of consecutive objects).

The above-mentioned "selected parts" of the system include the A and B channels of the imaging sensor 21 and the video processors 51A and 51B. More specifically, the diagnostic processor 57 tests the operation of the imaging sensor 21 by selectively testing the channel B and channel A average voltages applied thereto from respective latches 63B and 63A and also tests the operation of the video processors 51B and 51A by selectively testing the channel B and channel A center pixels 512 and 513 applied thereto from respective latches 55B and 55A. The specific operation of the diagnostic processor 57 will be subsequently discussed more fully.

During its operation, the diagnostic processor 57 supplies a control signal to control the operation of a primary power relay 65 to either supply or not supply primary power (not shown) to a power supply 67 as a function of the amplitude of the control signal. When so controlled the power supply 67 either turns the light source or lamp 15 on or off. In an alternate arrangement, the relay 65 could be eliminated and the control signal could be supplied from the diagnostic processor 57 directly to the power supply 67 or to the power supply 67 via a digital to analog converter (DAC) 68 (as shown in FIG. 4A) to cause the power supply 67 to either supply or not supply power to the light source 15 as a function of the amplitude of the control signal. In either case, the light source 15 is either turned off or on as a function of the amplitude of the control signal.

During the first mode of operation, the control signal has an insufficient amplitude to energize the relay 65 (or to turn on the power supply 67 when the control signal is directly applied to the power supply 67). As a result, the power supply provides no power to the light source 15 and the light source 15 is "off". With the light source "off", the sensor 21 scans the unilluminated reference background 11 (since no object 17 is present in the track 13 during the first mode of operation).

After the first mode of operation is completed, the second mode of operation begins. During the second mode of operation, the control signal has a sufficient amplitude to energize the relay 65 (or to turn on the power supply 67 when the control signal is applied directly or via DAC 68 to the power supply 67). The power supply 67 therefore supplies power to turn on the light source 15. Sensor 21 scans the illuminated reference background 11 (since no object 17 is present in the track 13 during the initial second mode of operation).

During each of the first and second modes of operation, the system of FIG. 1 processes the channel A and channel B outputs of the sensor 21 in the same manner as described before.

Figure 5:
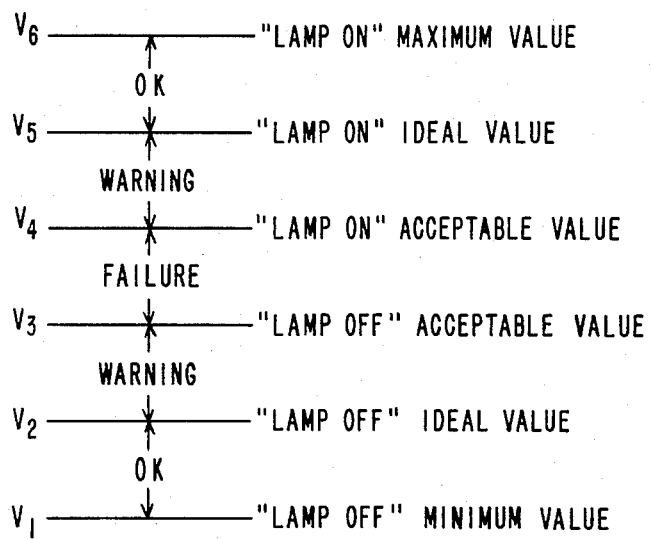
FIG. 5 illustrates an exemplary set of reference voltages used by the diagnostic processor of FIG. 1.

FIG. 5 illustrates an exemplary set of reference voltages, $V_1$ through $V_6$, against which the diagnostic processor 57 can compare, for example, the average voltage of each of channels A and B during each of the first and second modes of operation. The reference voltages $V_1$ through $V_6$ can respectively represent the minimum, ideal and acceptable average values when the lamp 15 is "off" (first mode of operation) and the acceptable, ideal and maximum average values when the lamp 15 is "on" and no object 17 is present in the track 17 (second mode of operation). During the first mode of operation each average voltage of channels A and B is selectively compared with the voltages $V_1$ through $V_3$. Similarly, during the second mode of operation, each average voltage of channels A and B is selectively compared with the voltages $V_4$ through $V_6$. A set of reference voltages, similar to that shown in FIG. 5, is utilized by the diagnostic processor 57 to compare each center pixel in channels A and B with during each of the first and second modes of operation.

If the amplitude of the signal being tested (average voltage or pixel value) falls within the range between $V_1$ and $V_2$ during the first mode of operation (or between $V_5$ and $V_6$ during the second mode of operation), the operation of the associated "selected part" of the system (channel A or channel B of sensor 21 or one of the video processors 51A and 51B) is good or "OK".

If the amplitude of the signal being tested falls within the range between $V_2$ and $V_3$ during the first mode of operation (or between $V_4$ and $V_5$ during the second mode of operation), the diagnostic processor 57 sends a "warning" signal to a trouble monitor circuit 69 to cause the circuit 69 to produce a visual or auditory warning of the problem to be corrected in the associated "selected part" of the system. The system would still be operational with such a warning indication, but the indicated problem should be corrected by a technician before the system fails.

Finally, if the amplitude of the signal being tested exceeds $V_3$ during the first mode of operation (or is less than $V_4$ during the second mode of operation), the diagnostic processor 57 stops the operation of the system and sends a "failure" signal to the trouble monitor circuit 69 to indicate the failure and possible cause of that failure. Once a failure is detected no other tests can be performed by the diagnostic processor 57. A technician preferably must correct the cause of the failure before the operation of the system can be restored.

The applicable ones of the "OK", "warning" and "failure" signals for the A and B channels of sensor 21 and processors 51A and 51B, as well as the associated probable cause of that warning or failure, comprise the diagnostic output signals (DOS) that are selectively applied from the diagnostic processor 57 to the trouble monitor circuit 69.

Once the diagnostic processor 57 has entered the second mode of operation, it remains in this second mode of operation to repeatedly test the operations of the A and B channels of the imaging sensor 21 and of the video processors 51A and 51B. However, even this second mode of operation is temporarily interrupted each time that an object 17 to be imaged by the sensor 21 is detected in the track 13. More specifically, as an object 17 to be imaged moves down the track or conveyor line 13 toward the reference background 11, it passes between a light emitting diode (LED) 71 and sensor 73 which are respectively positioned on opposite sides of the track or conveyor line 13 and downstream from the reference background 11. The passage of an object 17 between the elements 71 and 73 interrupts the light path between the LED 71 and sensor 73, causing the sensor 73 to develop and apply an "object present" signal to the diagnostic processor 57. This "object present" signal prevents the diagnostic processor 57 from utilizing any of the test signals from latches 63A, 63B, 55A and 55B or sending any diagnostic output signals (DOS) to the trouble monitor 69.

After the object 17 has been imaged and moved far enough down the track 13 to uncover the reference background 11, it passes between a LED 75 and a sensor 77 (similar to the LED 71 and sensor 73), respectively positioned on opposite sides of the track 13 and upstream from the reference background 11. The passage of the object 17 between the elements 75 and 77 causes the sensor 77 to develop and apply an "object not present" signal to the diagnostic processor 57. This "object not present" signal enables the processor 57 to utilize the test signals from the latches 63A, 63B, 55A and 55B and to send new DOS signals to the trouble monitor 69.

The diagnostic processor 57 will be explained in greater detail by now referring to FIG. 6.

Figure 6:
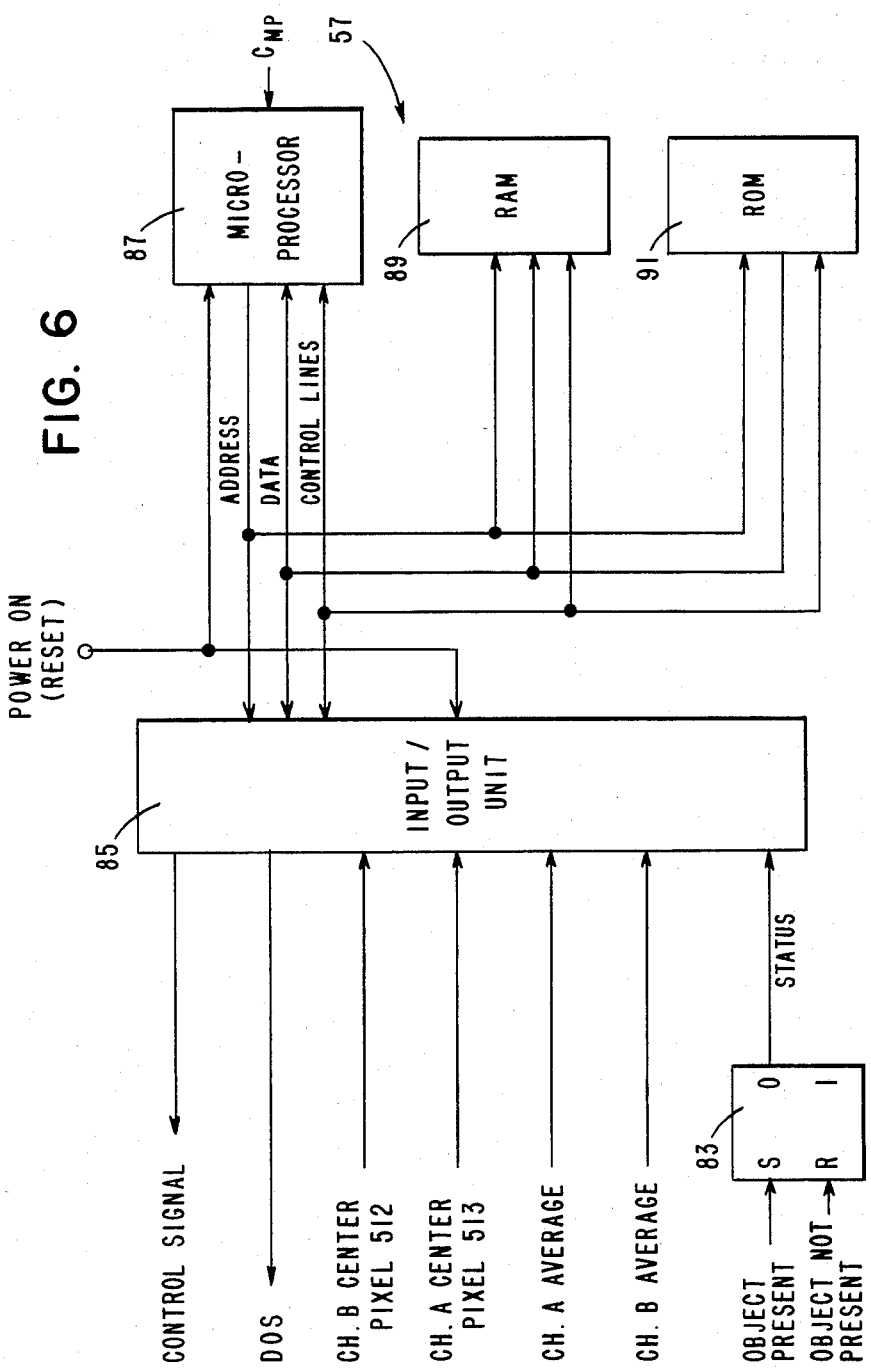
FIG. 6 illustrates a schematic block diagram of the diagnostic processor of FIG. 1.

As shown in FIG. 6, the diagnostic processor 57 is comprised of an RS flip flop 83, an input/output unit 85, a microprocessor 87, a random access memory (RAM) 89 and a read only memory (ROM) 91.

Structurally, input/output unit 85 can be implemented by means of two 8255 input/output circuits manufactured by Intel, Santa Clara, Calif.; microprocessor 87 can be implemented by means of an Intel 8085 A-2 microprocessor; ROM 91 can be an Intel 2716 EPROM; and RAM 89 can be a TMM2016 RAM manufactured by Yoshiba America, Irvine, Calif.

RAM 89 is a scratch pad memory which is used to store temporary data in temporary memory locations. ROM 91 stores a software program which is executed by the microprocessor 87 by way of address, data and control lines which interconnect the microprocessor 87 with the input/output unit 85, RAM 89 and ROM 91.

The microprocessor 87 includes a timing control circuit, which includes a program counter, and is similar in structure and operation to the timing and control circuit 23. This timing control circuit is responsive to the $C_{MP}$ clocks for supplying addresses and timing signals to control the operations of the other circuit components in the diagnostic processor 57 according to the operations shown in the flow charts in FIGS. 7A through 7H. The microprocessor 87 also includes an arithmetic logic unit (not shown) for performing the 7A through 7H on data received from the input/output unit 85, RAM 89 and ROM 91.

Channel B center pixel 512, channel A center pixel 513, channel A average and channel B average test signals are selectively applied from the latches 55B, 55A, 63A and 63B through the input/output unit 85 for storage in associated storage locations of RAM 89. In addition, the diagnostic output signals (DOS) are applied through the input/output unit 85 to the trouble monitor 69. The O side of flip flop 83 develops a "status" signal which is passed through the input/output unit 85 to the microprocessor 87 via "control lines". The logical state of this status signal either enables or disables the testing operation of the microprocessor 87.

An "object present" signal from the sensor 73 sets the flip flop 83 to develop a 1 state status signal to cause the microprocessor 87 to stop its testing operation and wait for a 0 state status signal. On the other hand, an "object not present" signal from the sensor 77 resets the flip flop 83 to develop a 0 state status signal to enable the microprocessor 87 to perform its testing operation.

It should be pointed out at this time that, if the system is utilized for scanning information from moving objects, the LED 75 and sensor 77 may not be needed if the microprocessor 87 or external circuitry (not shown) generates the "object not present" signal based on a known speed of the track 13. In this case, the microprocessor 87 or external circuitry would automatically generate an "object not present" signal a predetermined time after the trailing edge of the moving object has passed the LED 71 and sensor 73. Thus, the microprocessor 87, for example, would sample the logical state of the "status" signal. If this "status" signal were in a logical 1 state, then the microprocessor 87 would wait until it changed to a logical 0 state. A timer (not shown) can be included within the microprocessor 87 to limit the wait loop state. In this manner, if the normal transit time of the object were exceeded, an error condition would be flagged by the microprocessor 87 to indicate, for example, a track jam condition.

The first mode of operation is begun by the diagnostic processor 57 when power is first applied to the system. At this time a "power on" signal is generated by, for example, a "power on" switch (not shown) to reset the microprocessor 87, RAM 89, ROM 91 and input/output unit 85. Upon being reset, the program counter in the microprocessor 87 starts to address the ROM 91 to control what steps in the ROM's stored software program will be sequentially executed. The operation of the diagnostic processor 57 can best be explained by now referring to the flow charts shown in FIGS. 7A through 7H, in conjunction with the circuitry shown in FIGS. 1 and 6.

Figure 7A:
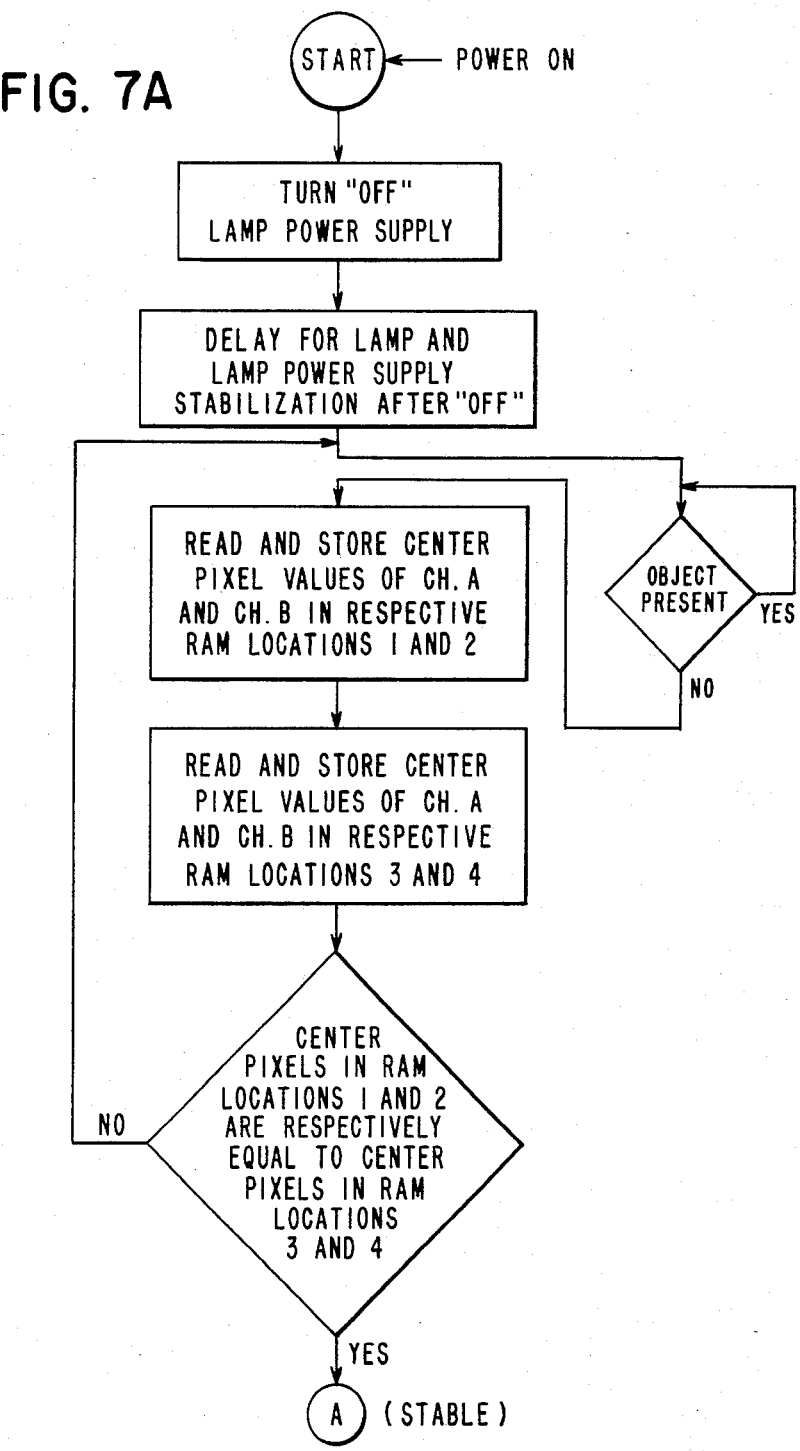

As shown in FIG. 7A, the "power on" signal enables the microprocessor 87 to start executing the self-diagnostic program that it starts reading out of the ROM 91. A low amplitude control signal is applied via the control lines from the microprocessor 87, through input/output unit 85 and gating circuit 81 to primary power relay 65. Since this control signal is at a low amplitude, relay 65 remains de-energized and no primary power is applied to power supply 67. As a result, the light source or lamp 15 remains "off". Thus, the imaging sensor 21 scans an unilluminated reference background 11 and develops black or dark voltage outputs on its output channels A and B. The circuits 51A, 53A, 55A, 51B, 53B, 55B, 59A, 61A, 63A, 59B, 61B and 63B selectively process these dark voltages from the imaging sensor 21, as discussed before, to apply channel A and channel B center pixel and average voltage test signals to the diagnostic processor 57 during this first mode of operation.

After the "power on" signal is initially generated, there is a suitable delay to allow for the stabilization of the lamp 15 and lamp power supply 67 to an "Off" condition. If no object 17 is present in front of the imaging sensor 21, the center pixel values of channels A and B for one scan are then read and respectively stored in temporary locations 1 and 2 (not shown) of RAM 89. On the following scan, if an object 17 is still not present in front of the imaging sensor 21, the center pixel values of channels A and B are read and respectively stored in temporary locations 3 and 4 (not shown) of RAM 89. If an object 17 is present before the imaging sensor 21, no reading and storage of data in the RAM 89 takes place until the object 17 is no longer present. The center pixels in RAM locations 1 and 2 are respectively compared to the center pixels in RAM locations 3 and 4. If they are not respectively equal, this means that the lamp 15 and/or lamp power supply 67 have still not stabilized to "off" or have changed since the previous center pixel samples. In this case the channel A and channel B center pixel values in consecutive pairs of scans are read, stored and respectively compared, until the associated center pixel values in a pair of scans are respectively equal.

Figure 7B:
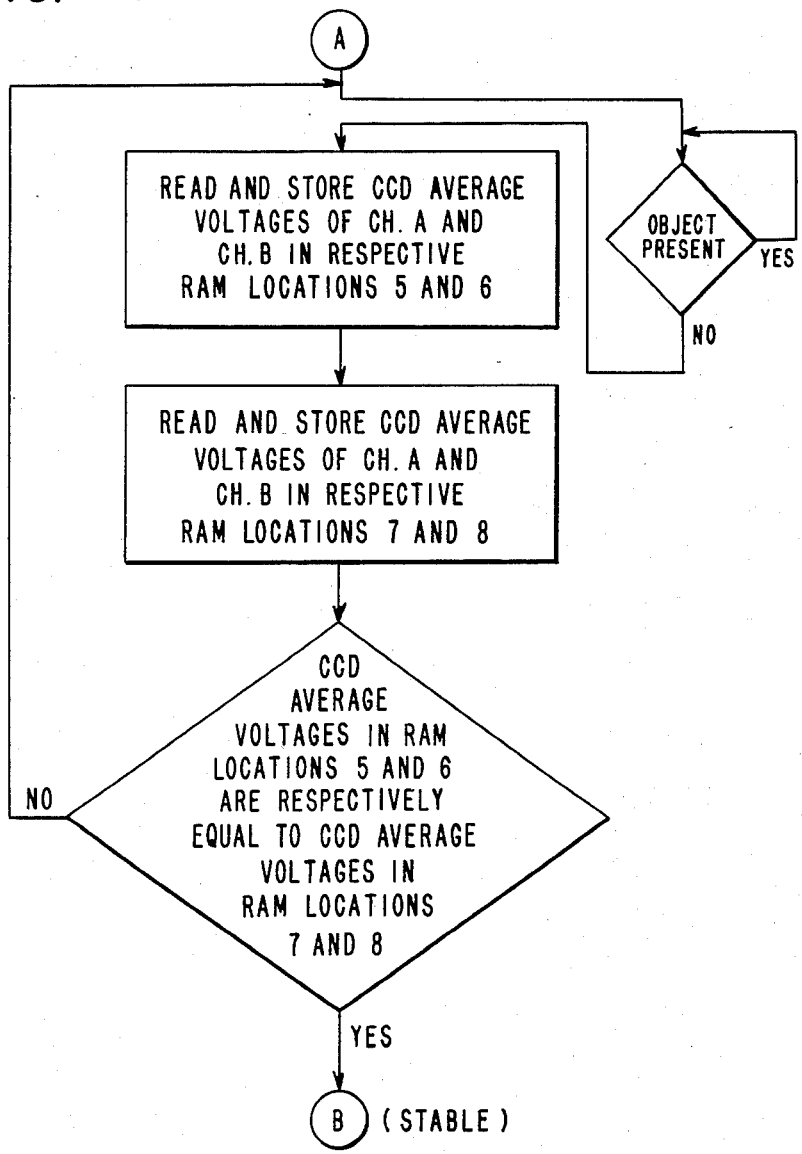

As shown in FIG. 7B, the same procedure is then followed for consecutive average voltages as was followed for consecutive center pixel values. More particularly, the average voltages for channels A and B for one scan are read and respectively stored in temporary RAM locations 5 and 6 (not shown). On the next scan, the average voltages of channels A and B are read and respectively stored in temporary RAM locations 7 and 8 (not shown). The average voltages in RAM locations 5 and 6 are respectively compared to the average voltages in RAM locations 7 and 8. If the channel A and channel B average voltages in one scan are not respectively equal to those in the following scan, the channel A and channel B average voltages in consecutive pairs of scans are read, stored and respectively compared, until the associated average voltages in a pair of scans are respectively equal.

Referring now to FIG. 7C, when all of the center pixel and average voltage test signals in channels A and B are stabilized values, the test signals are selectively compared with reference voltages, such as previously discussed in relation to FIG. 5. The reference voltages (i.e., $V_1$ through $V_6$ in FIG. 5) either can be in software code (not shown) stored in the ROM 91 or can be in hardware (not shown) in the form of printed circuit board switches accessible by the input/output unit 85. If they are hardware reference voltages, each of the test values stored in the associated locations of RAM 89 can be selectively read out and compared with the hardware references in an arithmetic unit (not shown) in the microprocessor 87. On the other hand, if the reference voltages are in software code stored in the ROM 91, then the test values stored in the associated locations in the RAM 89 and the software reference voltages in the ROM 91 can be selectively read out and compared in an arithmetic unit (not shown) in the microprocessor 87.

Figure 7D:
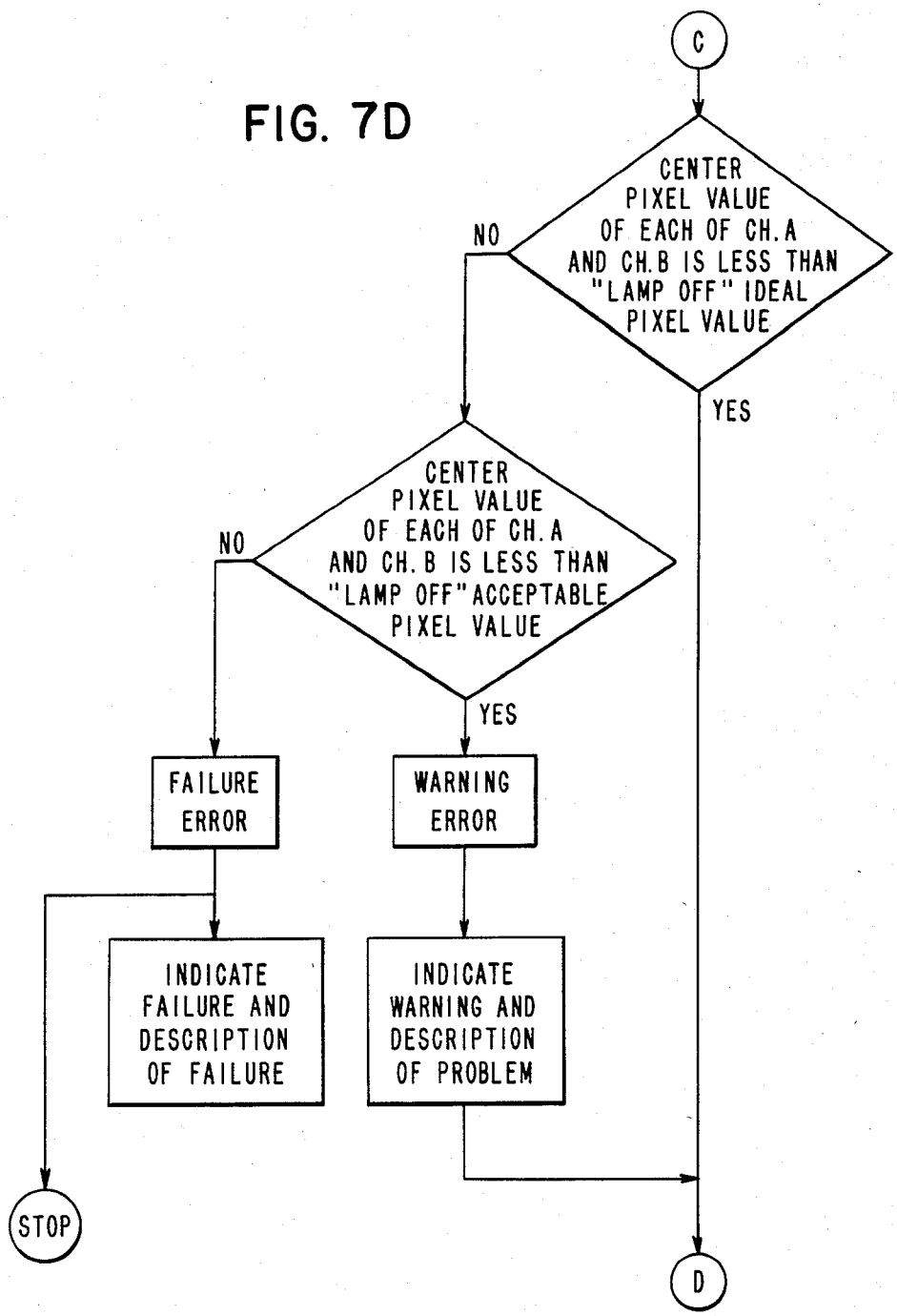

If, as shown in FIG. 7C, each of the channel A and channel B average voltages that are read out from locations 5 and 6 of RAM 89 is less than the "lamp off" ideal average value ($V_2$ in FIG. 5), then those average voltages are "OK" for this first mode of operation and the diagnostic processor 57 sends an "OK" signal to the trouble monitor 69 for that test and proceeds to the center pixel test shown in FIG. 7D. However, if either of the channel A and channel B average voltages is greater than $V_2$, but each of those average voltages is less than the "lamp off" acceptable average voltage ($V_3$), then a "warning" DOS signal and a description of the problem are sent by the microprocessor 87 to the trouble monitor 69 to indicate that the equipment is still operational but that, for example, the lamp 15 is partially "on" for one reason or another and it should be checked by a technician. Finally, if either of the channel A and channel B average voltages is greater than $V_3$, the microprocessor 87 will stop the operation of the system and send a "failure" DOS signal and a description of the failure of, for example, the sensor 21 to the trouble monitor 69.

If neither of the channel A and channel B average voltages exceeds $V_3$, the imaging sensor 21 is still operational when the lamp 15 is "off" and the microprocessor 87 starts to execute the program for the next test, as shown in FIG. 7D.

In FIG. 7D the center pixel values of channels A and B are selectively compared in the microprocessor 87 with a set of reference voltages similar to $V_1$ through $V_6$ of FIG. 5). As discussed before, these reference voltages can either be in hardware or in software code. For purposes of this discussion on the testing of center pixels, the values $V_1$ through $V_6$ of FIG. 5 will be used. It should be understood, however, that a different set of reference voltages would usually be used for the center pixel values than for the average values.

If each of the center pixel values of channels A and B that are read out from locations 1 and 2 of RAM 89 is less than the "lamp off" ideal pixel value ($V_2$ in FIG. 5), then those pixel voltages are "OK" and the diagnostic processor sends an "OK" signal to the trouble monitor 69 for that test and proceeds to the "lamp on" tests shown in FIGS. 7E through 7H. However, if either of the center pixel values of channels A and B is greater than $V_2$, but each of those center pixel values is less than the "lamp off" acceptable pixel value ($V_3$), then a warning DOS signal and a description of the problem are sent by the microprocessor 87 to the trouble monitor 69 to indicate that the equipment is still operational, but defective, and should be checked by a technician. Finally, if either of the center pixel values of channels A and B is greater than $V_3$, the microprocessor 87 will stop the operation of the system and send a description of the failure of, for example, one of the video processors 51A and 51B to the trouble monitor 69.

If neither of the center pixel values of channels A and B exceeds $V_3$, both of the A and B channels of the imaging sensor 21 and both of the video processors 51A and 51B are still operational after being tested by the diagnostic processor 57 during the first mode of operation (when the lamp 15 is turned "off"). At this time, the diagnostic processor 57 has completed its first mode of operation and starts its second mode of operation by supplying a relatively high amplitude control signal from the microprocessor 87 through the control lines, through input/output unit 85 and gating circuit 81 to energize the primary power relay 65. Upon being energized the relay 65 applies primary power to the power supply 67 to turn the light source or lamp 15 "on".

Now the imaging sensor 21 scans an illuminated reference background 11 to develop white or bright voltage outputs on its output channels A and B. The circuits 51A, 53A, 55A, 51B, 53B, 55B, 59A, 61A, 63A, 59B, 61B and 63B selectively process these white voltages from the imaging sensor 21, as discussed before, to apply channel A and channel B center pixel and average voltage test signals to the diagnostic processor 57 during this second mode of operation.

Figure 7E:
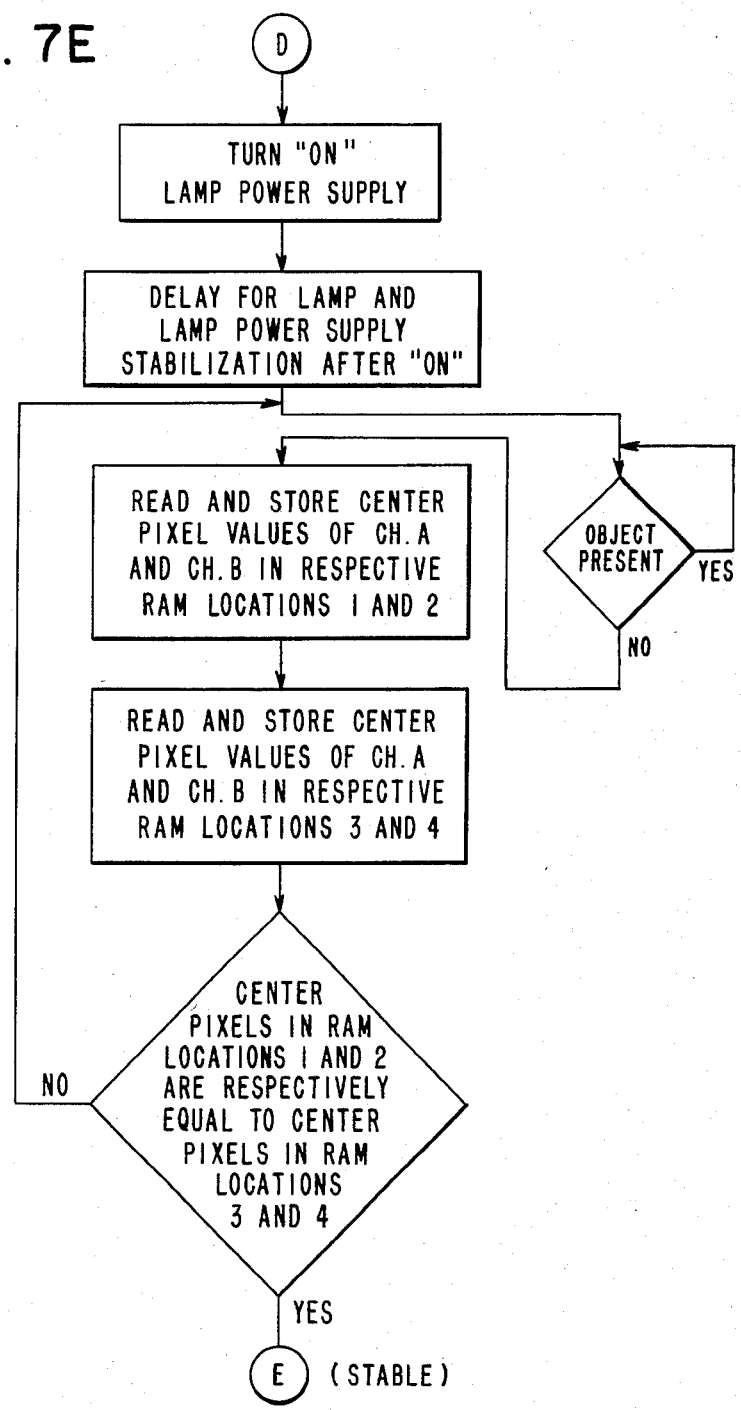
Figure 7F:
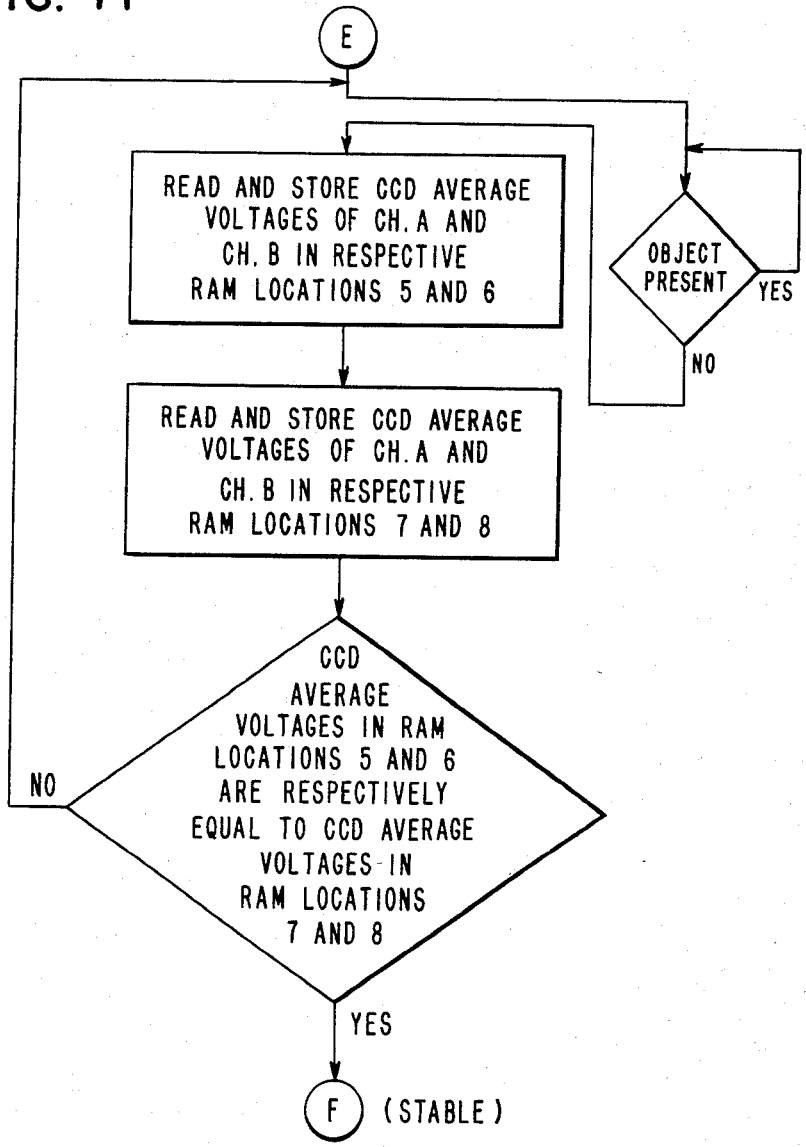

As shown in FIG. 7E, after the lamp power supply 67 has been turned on, the microprocessor 87 allows a suitable delay for the lamp 15 and lamp power supply 67 to stabilize in operation. After this suitable delay the diagnostic processor 57 performs the same sequence of operations in FIGS. 7E and 7F that it performed in 7A and 7B, except that the lamp 15 has been turned "on" for the operations shown in FIGS. 7E and 7F ( and also in FIGS. G and H).

Figure 7G:
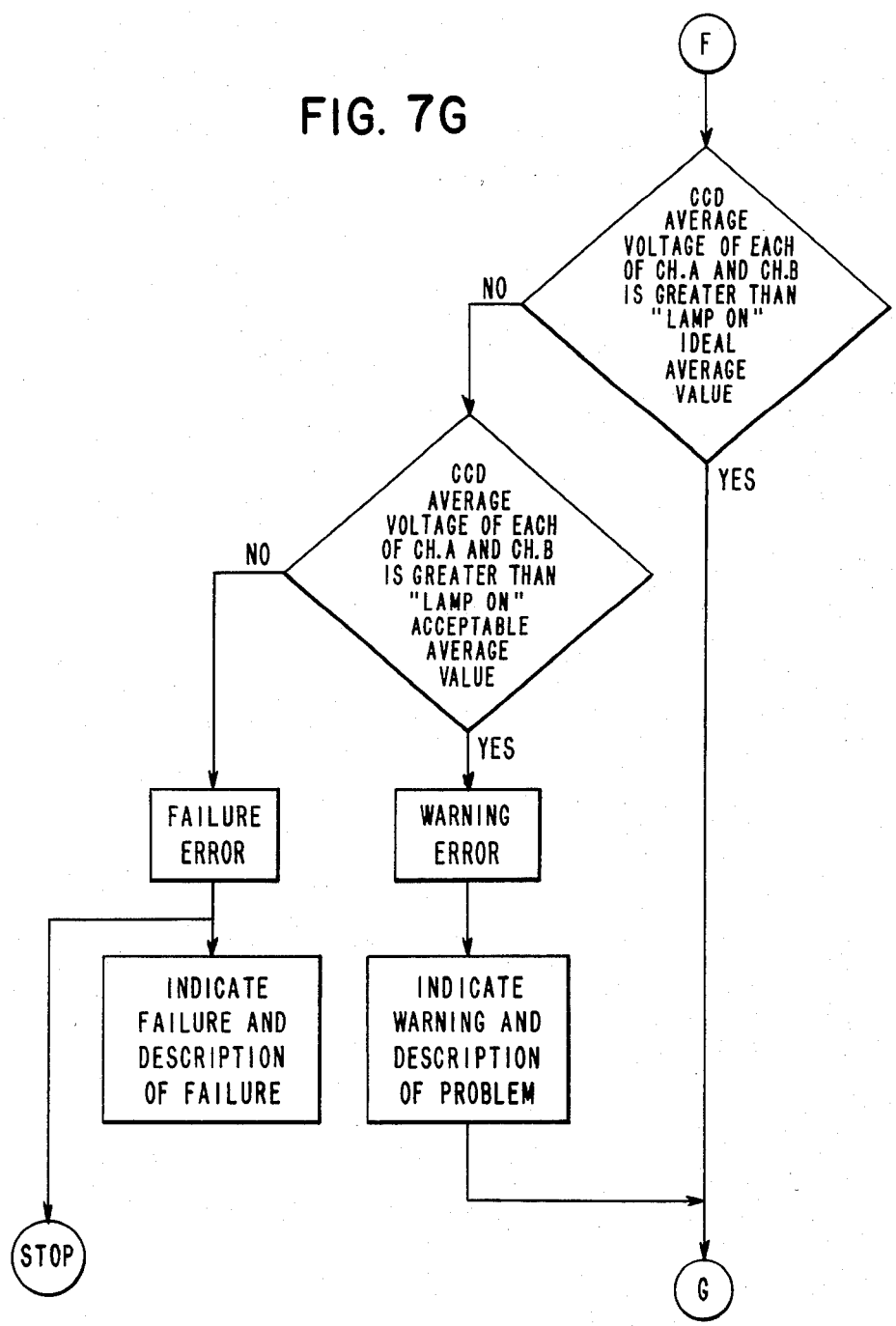
Figure 7H:
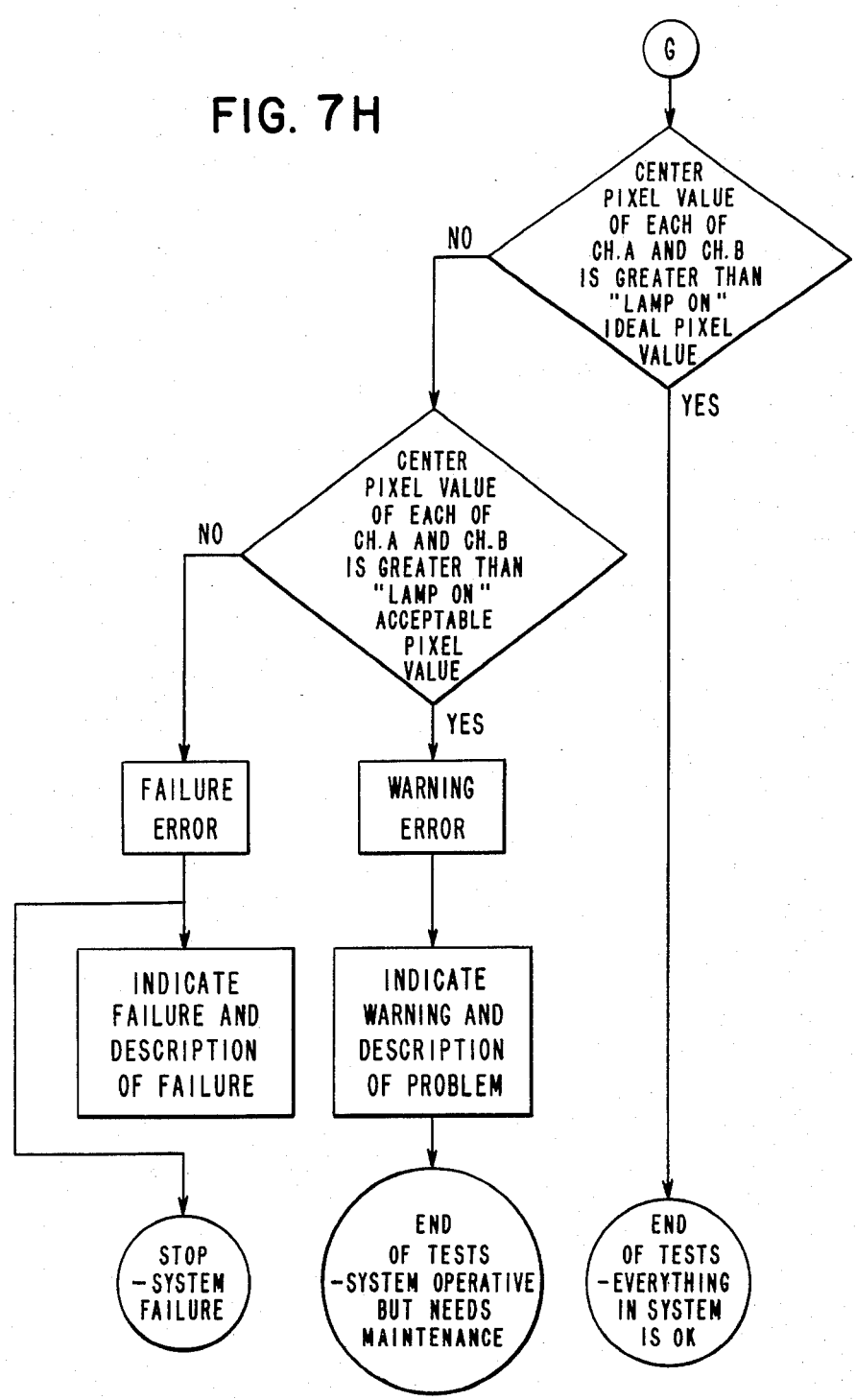

Referring now to FIG. 7G, if each of the average voltages of channels A and B is greater than the "lamp on" ideal average value ($V_5$ in FIG. 5), then those average voltages are "OK" for this second mode of operation and the diagnostic processor 57 sends an "OK" signal to the trouble monitor 69 for this test and the processor 57 proceeds to the "lamp on" center pixel test shown in FIG. 7H. However, if either of the average voltages for channels A and B is less than $V_5$, but each of those average voltages is greater than the "lamp on" acceptable average voltage ($V_4$), a "warning" DOS signal and a description of the problem are sent by the microprocessor 87 to the trouble monitor 69 to indicate that the equipment is still operational but has some defect such as, for example, a dirty lens assembly 19 or dirty or defective cells in the imaging sensor 21. Finally, if either of the average voltages for channels A and B is less than $V_4$, the microprocessor 87 will stop the operation of the system and send a "failure" DOS signal and a description of the failure of, for example, the imaging sensor 21 during this second mode of operation to the trouble monitor 69.

If neither of the channel A and channel B average voltages is less than $V_4$, the imaging sensor 21 is still operational when the lamp 15 is "on" and the microprocessor 87 starts to execute the program for the last diagnostic test in the sequence, as shown in FIG. 7H.

In FIG. 7H, if each of the center pixels of channels A and B is greater than the "lamp on" ideal pixel value ($V_5$), then those center pixels are "OK" for this second mode of operation and the diagnostic processor 57 ends the sequence of tests and sends an "OK" signal to the trouble monitor 69. If either of the channel A and channel B center pixels is less than the "lamp on" ideal pixel value ($V_5$), but each of these center pixels is greater than the "lamp on" acceptable center pixel value ($V_4$), the diagnostic processor 57 ends the sequence of tests and sends a "warning" DOS signal and a description of the problem to the trouble monitor 69 to indicate that the equipment is still operational but has some defect which a technician should correct. Finally, if either of the center pixel values for channels A and B is less than $V_4$, the microprocessor 87 will stop the operation of the system and send a "failure" DOS signal and a description of the failure of, for example, one of the video processors 51A and 51B during this second mode of operation to the trouble monitor 69.

The testing program stored in the ROM 91 can also provide for the continuous testing of the test signals applied from the latches 55A, 55B, 63A and 63B to the diagnostic processor 57 during the second mode of operation. For such continuous testing of the test signals during the second mode of operation of the diagnostic processor 57, the operational steps shown in FIGS. 7E through 7H would be sequentially performed and continuously repeated, with the omission of the "turn on" and "delay" steps shown in FIG. 7E. As discussed before, such continuous testing would only occur in between the imaging of objects 17. The detection of an object 17 moving toward the optical path between the reference background 11 and the sensor 21 would cause the sensor 73 to generate an "object present" signal to set the flip flop 83 to prevent any new test signals from being stored in the RAM 89 until a subsequent "object not present" signal resets the flip flop 83. This "object not present" signal, it will be recalled, is generated by the sensor 77 after the object 17 has moved past the reference background 11.

For those applications where a stationary object, rather than a moving object, is to be imaged, certain modifications can be made in the circuitry of FIG. 1. The track or conveyor line 13, the LEDS 71 and 75 and the sensors 73 and 77 could be eliminated. Here again the automatic self-diagnostic testing of the average voltage and pixel test signals could be accomplished when the power is first turned on or in between the imaging of stationary objects. When it is desired to test the test signals between the imaging of objects, light interrupting means, such as LED 71, sensor 73, LED 75 and sensor 77, could be utilized to temporarily interrupt and then restore continuous testing in the second mode of operation, in a manner similar to that previously discussed.

The invention thus provides a method and system for automatically performing self-diagnostic tests on itself.

While the salient features of the invention have been illustrated and described, it should be readily apparent to those skilled in the art that many other changes and modifications can be made in the system and method of the invention presented without departing from the spirit and true scope of the invention. For example, the system of FIG. 1 could comprise only one channel, instead of two, by utilizing a single channel imaging sensor 21 and by eliminating the elements 51A, 53A, 55A, 59A, 61A and 63A in the A channel. On the other hand, more than two channels could be utilized for faster data readout from the imaging sensor 21. Accordingly, the present invention should be considered as encompassing all such changes and modifications of the invention that fall within the broad scope of the invention as defined by the appended claims.

I claim:

1. An automatic, self-diagnosing, electro-optical imaging system comprising:
    a reference background for reflecting radiant energy impinging thereon;
    first means for illuminating said reference background with radiant energy during an on mode of operation;
    second means including a photosensor for generating a first signal proportional to the intensity of reflected radiant energy received from said reference background during said on mode of operation;
    third means responsive to the first signal for producing an associated first data signal;
    fourth means selectively responsive to the first signal and first data signal for selectively developing test signals during said on mode of operation; and
    fifth means for initiating said on mode of operation, said fifth means including sixth means responsive to the first plurality of test signals for automatically testing the operation of each of said second and third means during said on mode of operation.

2. The system of claim 1 wherein:
    said first means prevents the illumination of said reference background during an off mode of operation;
    said second means generates a second signal proportional to the intensity of reflected radiant energy received from said reference background during said off mode of operation;
    said third means being responsive to the second signal for producing an associated second data signal;
    said fourth means being selectively responsive to the second signal and second data signal for selectively developing test signals during the off mode of operation; and
    said fifth means initiates said off mode of operation, and said sixth means is responsive to the second plurality of test signals for automatically testing the operation of each of said second and third means during said off mode of operation.

3. The system of claim 2 wherein said second means further includes:
a lens for focusing radiant energy reflected from said reference background onto said photosensor.

4. The system of claim 2 wherein said photosensor is a charge coupled device array.

5. The system of claim 2 further including:
means for moving an object to be imaged by said photosensor along a path across said reference background; and
sensor means positioned adjacent to the path being responsive to the presence of an object moving along the path before it reaches said reference background for causing said fifth means to prevent said off mode of operation.

6. The system of claim 2 wherein said fourth means includes:
seventh means selectively responsive to the first and second signals for respectively producing first and second test signals proportional to the average amount of reflected radiant energy received by said photosensor from said reference background over respective first and second predetermined periods of time during the associated on and off modes of operation; and
eighth means for developing third and fourth test signals respectively representative of first and second preselected portions of said first and second data signals.

7. The system of claim 6 wherein said sixth means includes:
means for selectively comparing each of the first, second, third and fourth test signals with an associated range of reference voltages to determine the operational status of each of said second and third means during each of said on and off modes of operation.

8. The system of claim 6 wherein said first means includes:
a source of radiant energy;
a power supply for supplying a voltage to said source when said power supply is enabled; and
a control unit for disabling said power supply to prevent said source from illuminating said reference background during said off mode of operation and for enabling said power supply to cause said source to illuminate said reference background during said on mode of operation.

9. The system of claim 8 wherein:
said control unit is a digital to analog converter for converting a digital control signal received from said fifth means during said on mode of operation into an analog control signal, said power supply being responsive to said analog control signal for causing said source to illuminate said reference background only during said on mode of operation.

10. The system of claim 8 wherein:
said control unit is a relay responsive to a control signal received from said fifth means only during said on mode of operation for enabling said power supply to cause said source to illuminate said reference background during said on mode of operation.

11. The system of claim 6 wherein said seventh means includes:
a first integrator for sequentially averaging the first and second signals over the respective first and second predetermined periods of time; and
a first analog to digital converter for sequentially digitizing the signals from said first integrator; and
a first storage circuit responsive to the digitized signals from said first integrator for selectively producing the first and second test signals.

12. The system of claim 11 wherein said eighth means includes:
a second analog-to-digital converter for sequentially digitizing the first and second data signals; and
a second storage circuit selectively responsive to the digitized first and second data signals for sequentially developing the third and fourth test signals.

13. The system of claim 12 wherein:
said fifth means generates a first control signal to control the operation of said first means during said on mode of operation and a second control signal to control the operation of said first means during said off mode of operation; and
said sixth means selectively compares each of the first, second, third and fourth test signals with an associated range of reference voltages to determine the operational status of each of said second and third means during each of said on and off modes of operation.

14. The system of claim 13 wherein said first means includes:
a source of radiant energy;
a power supply for supplying a voltage to said source when said power supply is enabled; and
a control unit being responsive to said second control signal for preventing said power supply from supplying a voltage to said source during said off mode of operation and being responsive to said first control signal for enabling said power supply to supply a voltage to said source to cause said source to illuminate said reference background during said on mode of operation.

15. The system of claim 14 wherein the first and second control signals are digital signals and said control unit includes:
a digital to analog converter for selectively converting the digital first and second control signals into analog first and second control signals.

16. The system of claim 15 wherein:
said control unit is a relay responsive to the second control signal for disabling said power supply and responsive to the first control signal for enabling said power supply.

17. The system of claim 14 wherein said second means further includes:
a lens for focusing radiant energy reflected from said reference background onto said photosensor.

18. The system of claim 2 wherein:
said photosensor includes first and second channels, said first signal comprising first and second sequences of pixel signals respectively developed by said first and second channels during said on mode of operation, said second signal comprising third and fourth sequences of pixel signals respectively developed by said first and second channels during said off mode of operation; and
said third means includes first and second signal processors, said first data signal comprising first and second sequences of pixel data respectively developed by said first and second signal processors during said on mode of operation, said second data signal comprising third and fourth sequences of pixel data respectively developed by said first and second signal processors during said off mode of operation.

19. The system of claim 18 wherein said fourth means includes:
   first and second circuit means being respectively responsive to the first and second sequences of pixel signals for producing first and second test signals proportional to the average amount of reflected radiant energy respectively received by said first and second channels during said on mode of operation and being respectively responsive to the third and fourth sequences of pixel signals for producing third and fourth test signals proportional to the average amount of reflected radiant energy respectively received by said first and second channels during said off mode of operation; and
   third and fourth circuit means for respectively developing fifth and sixth test signals respectively representative of first and second preselected portions of said first and second sequences of pixel data during said on mode of operation and seventh and eighth test signals respectively representative of the first and second preselected portions of said third and fourth sequences of pixel data during said off mode of operation.

20. The system of claim 19 wherein said photosensor is a charge coupled device array.

21. The system of claim 19 further including:
   means for moving an object to be imaged by said photosensor along a path across said reference background; and
   sensor means positioned adjacent to the path being responsive to the presence of an object moving along the path before it reaches said reference background for causing said fifth means to prevent said off mode of operation.

22. The system of claim 19 wherein said second means further includes:
   a lens for focusing radiant energy reflected from said reference background to said first and second channels.

23. The system of claim 19 wherein:
   said fifth means selectively generates first and second control signals to respectively control the operation of said first means during said on and off modes of operation; and
   said sixth means selectively compares each of said test signals with an associated range of reference voltages to determine the operational status of each of said first and second channels and each of said first and second signal processors during each of said on and off modes of operation.

24. The system of claim 23 wherein said first means includes:
   a source of radiant energy;
   a power supply for supplying a voltage to said source when said power supply is enabled; and
   a control unit responsive to the second control signal for disabling said power supply to prevent said source from illuminating said reference background during said off mode of operation and being responsive to the first control signal for enabling said power supply to supply a voltage to said source to cause said source to illuminate said reference background during on mode of operation.

25. The system of claim 24 wherein said first and second circuit means respectively include:
   first and second integrators for respectively averaging the first and second sequences of pixel signals over the first predetermined time during said on mode of operation and for respectively averaging the third and fourth sequences of pixel signals over the second predetermined time during said off mode of operation;
   first and second analog to digital converters for respectively digitizing the averaged signals from said first and second integrators during each of said on and off modes of operation; and
   first and second storage circuits selectively responsive to the digitized averaged signals from said first and second analog to digital converters for selectively producing the first, second, third and fourth test signals.

26. The system of claim 25 wherein said third and fourth circuit means respectively include:
   third and fourth analog to digital converters for respectively digitizing the first and second sequences of pixel data during said on mode of operation and for respectively digitizing the third and fourth sequences of pixel data during said off mode of operation; and
   third and fourth storage circuits selectively responsive to the digitized first, second, third and fourth sequences of pixel data for selectively producing the fifth, sixth, seventh and eighth test signals.

27. An automatic, self-diagnosing, electro-optical imaging system comprising:
   a light source;
   a reference background for reflecting light impinging thereon from said light source;
   control means for preventing said light source from illuminating said reference background during a first mode of operation and for enabling said light source to illuminate said reference background during a second mode of operation;
   an electro-optical imaging apparatus including photosensor means for selectively developing first and second analog signals respectively proportional to the intensity of reflected light received from said reference background during said first and second modes of operation and signal processing means selectively responsive to the first and second analog signals for developing associated first and second data signals;
   first means selectively responsive to the first and second analog signals for developing respective first and second test signals proportional to the average amount of reflected light received by said photosensor means from said reference background over first and second predetermined periods of time during the associated first and second modes of operation;
   second means for developing third and fourth test signals respectively representative of first and second preselected portions of said first and second data signals; and
   processor means for initiating the first and second modes of operation to control the operation of said control means during said first and second modes of operation and being selectively responsive to the first, second, third and fourth test signals for automatically testing the operation of each of said photosensor means and said signal processor means during each of said first and second modes of operation.

28. A method for automatically diagnosing the sequential operations of a photosensor and a signal processor coupled together in an electro-optical imaging apparatus, said method comprising the steps of:
- controlling a light source to not illuminate a reference background during a first mode of operation and to illuminate the reference background in a second mode of operation;
- sequentially outputting from the photosensor first and second signals proportional to the intensity of any reflected light respectively received by the photosensor from the reference background during the first and second modes of operation;
- sequentially developing in the signal processor third and fourth signals respectively derived from the first and second signals;
- selectively generating a plurality of test signals from the first, second, third and fourth signals; and
- selectively testing the operations of the photosensor and signal processor upon the selective reception of the plurality of test signals during the first and second modes of operation.

29. A method for automatically diagnosing the sequential operations of first and second channels of a photosensor and first and second video processors selectively coupled together in an electro-optical imaging apparatus, said method comprising the steps of:
- controlling a light source to not illuminate a reference background during a first mode of operation and to illuminate the reference background in a second mode of operation;
- outputting from the first and second channels of the photosensor respective first and second sequences of pixel signals during the first mode of operation and respective third and fourth sequences of pixel signals during the second mode of operation;
- outputting from the first and second video processors respective first and second sequences of pixel data during the first mode of operation and respective third and fourth sequences of pixel data during the second mode of operation;
- producing first and second test signals respectively proportional to the respective average values of the first and second sequences of pixel signals received during a first predetermined period of time and third and fourth test signals respectively proportional to the respective average values of the third and fourth sequences of pixel signals received during a second predetermined period of time;
- developing fifth and sixth test signals respectively representative of first and second preselected portions of the first and second sequences of pixel data and seventh and eighth test signals respectively representative of first and second preselected portions of the third and fourth sequences of pixel data; and
- selectively utilizing the first, second, third, fourth, fifth, sixth, seventh and eighth test signals to test the operations of the first and second channels of the photosensor and the first and second video processors during the first and second modes of operation.

* * * * *

UNITED STATES PATENT AND TRADEMARK OFFICE
CERTIFICATE OF CORRECTION

PATENT NO. : 4,509,077
DATED : April 2, 1985
INVENTOR(S) : Roger H. Therrien

It is certified that error appears in the above—identified patent and that said Letters Patent is hereby corrected as shown below:

Column 2, line 3: "applicants do" should be --applicant does--

Column 4, line 40: "demultiplexer" should be --multiplexer--.

Column 9, line 29: "Yoshiba" should be --Toshiba--.

FIG. 4, lower right hand side: "1024" should be --1023--.

Signed and Sealed this

Thirteenth Day of August 1985

[SEAL]

Attest:

DONALD J. QUIGG

Attesting Officer   Acting Commissioner of Patents and Trademarks